May 5, 1970     H. H. CLINTON     3,510,763
APPARATUS FOR TESTING THE INSULATION OF ELECTRICAL
WIRE OR CABLE BY HIGH VOLTAGE IMPULSES
Filed July 5, 1967
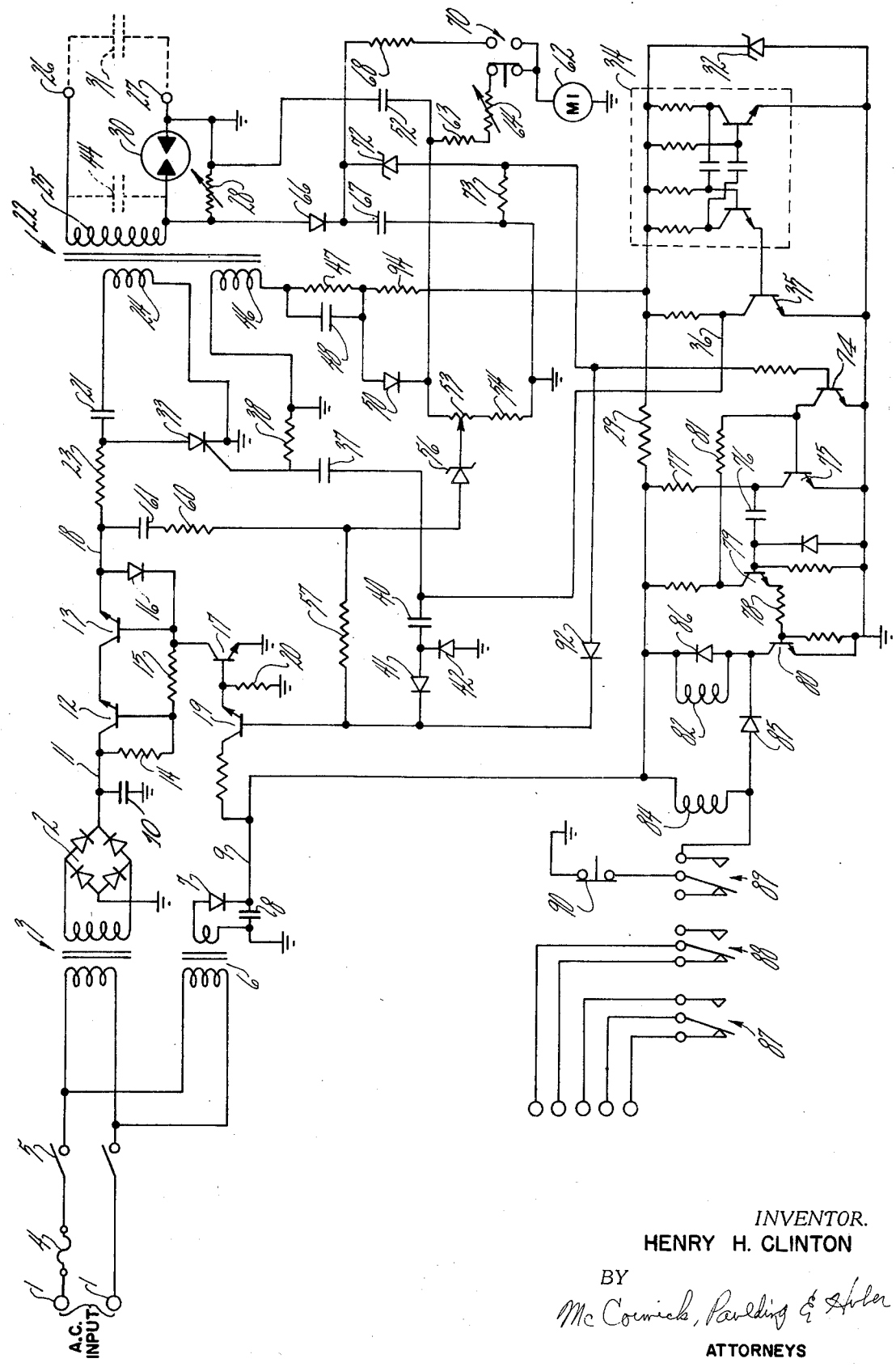
INVENTOR.
HENRY H. CLINTON
BY
ATTORNEYS 3,510,763
Patented May 5, 1970

1

3,510,763
APPARATUS FOR TESTING THE INSULATION OF ELECTRICAL WIRE OR CABLE BY HIGH VOLTAGE IMPULSES
Henry H. Clinton, Ridgewood, Clinton, Conn. 06413
Filed July 5, 1967, Ser. No. 651,283
Int. Cl. G01r 31/12; H03k 1/02; G05f 1/40
U.S. Cl. 324—54
17 Claims

ABSTRACT OF THE DISCLOSURE

A device for testing the integrity of the insulation of an electrical wire or cable by means of high voltage impulses applied to the insulation consists of a capacitor repeatedly discharged through the primary winding of a step-up transformer having its secondary winding connected to a suitable electrode. A voltage regulator for supplying direct current charging potential to the capacitor is regulated to maintain a given peak output voltage despite changes in the line voltage and the load. The charging and discharging of the capacitor is controlled by a circuit including a silicon controlled rectifier, and an auxiliary circuit working on the voltage regulator prevents the silicon controlled rectifier from being locked in an on condition by a spurious transient signal. Peak output voltage is measured by a tertiary winding on the transformer and output current by a variable resistance in series with the secondary winding and load. A circuit connected with the variable resistance registers a fault when the voltage across the resistance exceeds one value and acts on the voltage regulator to limit the output current when such voltage exceeds a still higher value.

BACKGROUND OF THE INVENTION

This invention relates to devices for testing electrical wire or cable, usually either during or immediately after manufacture, to search for faults in the insulation, and deals more particularly with such devices wherein high voltage impulses are applied to the outer surface of the insulation by a suitable electrode and faults detected by sensing the current supplied to the electrode, the high voltage producing a spark or arc upon the appearance of a fault at the electrode.

It is well known to test the integrity of the insulating sheath applied to an electrical conductor by applying a high voltage to the outside surface of the insulation so as to create a spark or arc when an imperfection appears at the point where the high voltage is applied. Both direct current and alternating current potentials have been used in such testing in the past and in the case of alternating current potentials, various different ranges of frequency have been used. At present, the use of alternating current potentials is generally preferred over direct current potentials for many applications, but most prior art devices utilizing alternating current potentials have used potentials with a generally sinusoidal waveform and have a tendency to generate an undesirable amount of heat. To overcome this heating problem, some recent testing devices have utilized output waveforms consisting of pulses which reduce the duty cycle.

This invention relates to an improved impulse tester wherein an accurately maintained high peak test voltage is applied to the insulation despite changes in the line voltage or the load and also whereby the current level which is representative of a fault may be accurately set at a desired amount above the normal capacitive current flow. A further aim of the invention is to provide an impulse wire tester using a capacitor discharge circuit for generating the voltage pulses, the charging and discharging of the condenser being controlled by a silicon controlled rectifier or similar electrically triggered switching element and with the device including a circuit for preventing such switching element from being locked in an on condition by a spurious transient signal. Another object of the invention is to provide an impulse testing device of the foregoing character including a means for automatically limiting the output current.

SUMMARY OF THE INVENTION

A capacitor is repeatedly charged from a source of direct current potential and discharged through the primary winding of a step-up transformer to produce high voltage impulses in the secondary winding which are applied to an electrical conductor, such as a wire or cable, for the purpose of detecting faults in its insulation. A tertiary winding on the transformer, through an associated peak voltage detector, controls a voltage regulator in the direct current potential source so that the magnitude of the output voltage is regulated against changes in the line voltage and in the line current or load. A silicon controlled rectifier is turned on by triggering pulses supplied by a free-running multivibrator to discharge the capacitor and is turned off to charge the capacitor by the voltage waveform which is induced back in the primary winding and which reverses its anode potential. Locking on of the silicon controlled rectifier by a spurious electrical transient triggering it before the capacitor can charge is prevented by a circuit which causes the voltage regulator to reduce the output voltage thereof at the end of each cycle and to accordingly reduce the anode current to a value below that required to sustain conduction. Output voltage is metered by metering the peak voltage developed in the tertiary winding. Load current is detected by an adjustable resistor in series with the secondary winding so as to develop a voltage across the resistor directly related to the load current. This voltage is rectified and applied to a capacitor. A Zener diode is connected in parallel with the latter capacitor and when the voltage across the capacitor exceeds the Zener voltage, the Zener diode conducts and produces a signal actuating an associated fault indicator. By means of a switch the capacitor may also be connected to a meter to permit monitoring of the load current. By adjusting the adjustable resistor while monitoring the load current the load current may be set at the beginning of a test run so that a selected percentage increase in such current will be registered as a fault.

BRIEF DESCRIPTION OF THE DRAWINGS

The single figure of the drawing is a schematic wiring diagram of a capacitor discharge impulse wire testing device embodying the present invention.

DESCRIPTION OF THE PREFERRED EMBODIMENT

Turning to the drawing, which illustrates schematically a capacitor discharge impulse wire tester embodying this invention, the device shown is energized by alternating current power supplied to two input terminals 1, 1, the input power being for example, a conventional 120 volt 60 c.p.s. supply. This alternating current supply is converted to direct current power by a bridge rectifier 2 and transformer 3 connected to the terminals 1, 1 through a fuse 4 and an on-off input switch 5. Another transformer 6 is also connected with the input terminals 1, 1 as shown and in conjunction with a diode 7 and filter capacitor 8 produces a low voltage direct current supply on the line 9 for energizing various parts of the circuit hereinafter described. The transformer 3 is a step-up transformer and produces in its secondary winding a secondary potential of several hundred volts AC which is rectified by the bridge rectifier 2 and filtered by an associated filtering capacitor 10.

The filter output voltage of the rectifier 2 appears on the line 11 and serves as an input to an associated voltage regulator consisting of two series connected regulating transistors 12 and 13. A resistor 14 is connected between the collector and base of the transistor 12, a resistor 15 is connected between the bases of the transistors 12 and 13 and a diode 16 is connected between the emitter of the transistor 13 and its base. Another transistor 17 is connected to the base of the transistor 13 as shown. The two resistors 14 and 15 cause the voltage drop across the regulator to be divided generally equally between the two transistors 12 and 13 and, from the arrangement shown, it will be evident that the conduction of the two transistors 12 and 13, and therefore, the regulated output voltage appearing on the regulator output line 18, is determined by the conduction of the transistor 17. The conduction of the transistor 17 is in turn determined by that of an associated transistor 19 connected to its base terminal along with a biasing resistor 20.

The regulated DC voltage appearing on the regulator output line 18 serves as a supply for a circuit capable of producing output voltage impulses, applied to the conductor under test, the peak value of which is related to the direct current input voltage so that by varying the input voltage the peak output voltage may be controlled. Such impulse producing circuit may take various different forms without departing from some of the broader aspects of this invention but preferably and as disclosed is a capacitor discharge system wherein a capacitor is repeatedly discharged through the primary winding of a step-up transformer to produce high voltage impulses across the secondary winding of such transformer. In the drawing, the capacitor discharge system includes a capacitor 21 and a step-up transformer 22. The capacitor 21 is connected to the output of the voltage regulator through a resistor 23 and is connected in series with the primary winding 24 of the transformer 22. The secondary winding 25 of the transformer has one end directly connected to one output terminal 26 and has its other end connected to a grounded second output terminal 27 through an adjustable resistor 28 connected in parallel with a gas sealed spark gap device or surge protector 30. The output pulses produced by the device appear at the two output terminals 26 and 27 and these terminals are connectible to the load which is usually substantially capacitive in nature and indicated in the drawing by the broken lines at 31, it being understood that the load generally constitutes a suitable electrode, through which the conductor under test is run, and the conductor itself.

The charging and discharging of the capacitor 21 is controlled by a triggered electronic switch which may be a thyratron but which preferably and as shown is a silicon controlled rectifier 33. Triggering pulses for turning on the silicon controlled rectifier 33 are provided by a free running multivibrator 34. The positive side of the multivibrator 34 is connected to the low voltage supply line through a resistor 29 and to ground through a Zener diode 32 which maintains the positive side at the Zener voltage to assure a substantially constant output frequency for the multivibrator. The multivibrator 34 produces pulses of generally rectangular waveform at the base of an associated transistor 35, the repetition rate of the pulses being somewhere within the audio range of 60 to 2,000 c.p.s., a rate of about 500 c.p.s. being presently preferred. The transistor 35 produces an amplified and inverted form of the multivibrator output on the line 36, such inverted waveform having rapid rise and fall times. The rapid positive going transitions are differentiated by a capacitor 37 and the gate resistance of the silicon controlled rectifier 33, the capacitor 37 being connected at one side to the line 36 and on the other side to the gate of the silicon controlled rectifier. Additional differentiation is also provided by a capacitor 40 in conjunction with the base input resistance of the transistor 19, the capacitor 40 having one side connected to the line 36 and the other side connected to the base of the transistor 19 through a diode 41. A path for restoring charge on the capacitor 40 is provided by an additional diode 42, and a path for restoring charge on the capacitor 47 is provided by a resistor 38. It will, therefore, be understood that as a result of the differentiation of the waveform appearing on the line 36 sharp triggering pulses of short duration are produced at the gate terminal of the silicon controlled rectifier 33 for turning it on at the instant each such pulses appears.

In the normal operation of the capacitor discharge system, the capacitor 21 is charged to a potential of several hundred volts by the regulated DC supply voltage produced by the voltage regulator on the line 18 and is then discharged through the primary coil 24 of the transformer 22 when the silicon controlled rectifier 33 is switched to a conducting state by a pulse appearing at its gate terminal. This sudden discharging of the capacitor through the primary winding induces a high voltage in the secondary winding 25 having a relatively rapid rise time. As the magnetic flux in the transformer 22 decays, the inductance of the winding 25 resonates with the winding capacitance, indicated by the broken lines at 44, and produces a damped sinusoidal voltage waveform having a frequency of several kilocycles which is impressed on the load 31. This waveform, however, persists for only several cycles and is therefore in the nature of an impulse.

The output voltage waveform appearing across the secondary winding 25 is induced back in the primary winding 24 and reverses the anode potential of the silicon controlled rectifier 33 causing it to be turned off. After the silicon controlled rectifier 33 is turned off, the capacitor 21 again charges so that when the next triggering pulse is applied to the gate terminal of the silicon controlled rectifier it again discharges through the primary winding 24 to produce another output voltage impulse, the same process thereafter being repeated in timed relation to the triggering pulses to produce repeated impulses of output voltage applied to the load.

A circuit is also provided for sensing the peak output voltage from the transformer 22 and for controlling the regulated DC supply voltage so as to maintain such peak output voltage at a substantially constant level despite changes in the load 31 and in the line voltage supplied to the main input terminals 1, 1. As part of such control circuit, the transformer 22 includes a tertiary winding 46 which is connected through a parallel resistor 47 and capacitor 48 to a peak voltage detector comprised of a diode 50 and capacitor 52. The voltage across the capacitor 52 is, therefore, representative of the peak positive voltage produced by the tertiary winding 46 and this in turn is directly related to the peak output voltage developed across the secondary winding 25. The peak voltage thus detected across the capacitor 52 appears across a series combination of resistors 53 and 54. The resistor 53 has a movable tap so that a selected portion of the detected voltage is applied through a Zener diode 56 and a resistor 57 to the base of the transistor 19 to control its conduction.

As mentioned previously, the conduction of the transistor 19 controls the conduction of the transistor 17 and this in turn controls the conduction of the two series voltage regulating transistors 12 and 13 to control the regulated output voltage appearing on line 18. More particularly, the action of the circiut is such that any increase in the peak output voltage appearing across the secondary winding 25 also increases the peak voltage appearing across the tertiary winding 46 and the voltage appearing across the capacitor 52. As this latter voltage increases, the signal supplied to the base of the transistor 19 increases causing it to conduct more heavily and as a result increasing the conduction of the transistor 17. The heavier conduction of the transistor 17 in turn decreases the conduction of the transistors 12 and 13 and therefore reduces the regulated output voltage appearing on the line 18. The reduced voltage on the line 18 in turn reduces the value of the peak output voltage across the secondary winding 25 by reducing the voltage to which the capacitor 21 is charged during each cycle. It is, therefore, apparent that the peak output voltage applied to the load is regulated and maintained at a substantially constant value despite changes in the line voltage or the load current.

Connected with the feed back loop between the transformer 25 and the voltage regulator is a series RC circuit, comprised of a resistor 60 and capacitor 61 in series, which compensates for phase shifts in the regulating loop and thereby prevents the loop from oscillating at some frequency.

The peak output voltage as detected by the capacitor 52 may be applied to a suitable meter to provide a visual indication of the peak output voltage. Such a meter is shown at 62 in the drawing and is connected to the capacitor 52 through two resistors 63 and 64, the resistor 64 being adjustable. The resistor 64 is adjusted to calibrate the meter to cause it to indicate the correct peak voltage at the output terminal 26. At this point, it should be noted that the tertiary winding 46 is particularly useful for the purpose of this output voltage metering since the leakage reactance and resistance of the primary winding 24 are eliminated from the measurement. Due to this leakage reactance and resistance, the errors introduced if the voltage across the primary winding 22 is used to measure the output voltage are too great to meet commercially acceptable standards. Also, the voltage appearing at the output terminal 26 is too high to measure accurately by any simple and practical means.

To improve the linearity of the volt meter circuit when reading the voltage across the capacitor 52 a resistor 94 is connected between the low voltage supply line feeding the positive side of the multivibrator 34 and the anode of the diode 50 to compensate for the voltage drop across the latter diode.

One problem with the use of a silicon controlled rectifier in a capacitive discharge system of the type previously described is that it is possible for it to be triggered to an on condition by a stray or spurious triggering signal occurring at such a time as to prevent it from thereafter being turned off. For example, as previously mentioned, the damped sinusoidal waveform induced back in the primary winding 24 is used to reverse the anode potential to turn off the silicon controlled rectifier 33. After the element 33 is turned off, the capacitor 21 is recharged during a brief interval before it is again turned on. If, however, some stray electrical transient should retrigger the silicon controlled rectifier immediately after the capacitor is discharged and before it has had an opportunity to recharge, it may thereafter remain in its on condition since the capacitor is unable to supply the power necessary for energizing the transformer 22 to produce the reflected waveform necessary for turning it off.

To prevent this condition from happening, the device illustrated in the drawing includes a circuit operable on the voltage regulator to reduce the voltage appearing on the line 18 to nearly zero during each cycle. Accordingly, if the silicon controlled rectifier should happen to lock in an on condition, its anode current is made to fall below the value required to sustain conduction during the next triggering pulse applied to its gate and, therefore, it must turn off.

The circuit for accomplishing this consists of the capacitor 40, and associated diodes 41 and 42, connected between the collector of the transistor 35 and the base of the transistor 19. During each cycle of operation, the capacitor 40 applies a positive pulse to the base of the transistor 19 and as a result of this reduces the conduction of the regulating transistors 12 and 13 to reduce the regulated voltage appearing on the line 18 to a nearly zero value, thereby forcing the silicon controlled rectifier 33 to turn off if in an on condition.

The load current is measured by measuring the voltage appearing across the resistor 28 connected in series with the secondary winding 25 between such winding the ground terminal 27. The spark gap device 30 connected in parallel with the resistor 28 prevents the voltage drop across this resistor from exceeding a predetermined value so as to avoid damage to the circuit components used for sensing the voltage drop. The means for measuring the voltage across the resistor 28 includes a diode 66 and a capacitor 67 connected in series with one another between the positive terminal of the resistor and ground. The diode 66 rectifies the voltage drop across the resistor 28 and charges the capacitor 67 so that the voltage across the capacitor is representative of the peak voltage appearing across the resistor 28. To the positive side of the capacitor 67 is connected a resistor 68 which may be connected to the meter 62 by operating a switch 70. Therefore, the meter 62 may be used to monitor the voltage appearing across the capacitor 67 which in turn is a measure of the load current and also a measure of the setting of the adjustable resistor 28.

Also connected to the positive side of the capacitor 67 is a fault registering or indicating circuit for registering a fault whenever the voltage across the capacitor 67 exceeds a predetermined value and also for reducing the output voltage supplied by the voltage regulator to the regulated DC supply line 18, so as to limit the load current, when the voltage across the capacitor 67 exceeds a still higher predetermined value. This latter means includes a Zener diode 72, having its cathode connected to the positive side of the capacitor 67, and a resistor 73 connected between ground and the anode of the Zener diode 72. Whenever the voltage across the capacitor 67 exceeds the Zener voltage of the diode 72 the diode 72 conducts and produces a voltage across the resistor 73. When this latter voltage rises to a high enough value, it applies a biasing voltage to the base of a transistor 74 causing it to conduct and reducing its collector potential. The collector of the transistor 74 is connected with the base of an associated transistor 75 and, therefore, as the collector potential of the transistor 74 is reduced, the transistor 75 is turned off, thereby allowing a capacitor 76 to charge through resistors 77 and 78 and the base-emitter circuits of transistors 79 and 80. As the capacitor 76 charges, the charging current flowing through the base-emitter circuit of the transistor 79 turns on the transistor 79 and decreases the potential at its collector terminal. This collector is connected to the base of the transistor 75 through a resistor 81 and, therefore, the decrease in the potential of the collector of the transistor 79 further reduces the conduction of the transistor 75. This regenerative process continues until the transistor 79 is fully conducting and the transistor 75 fully cut off with the capacitor 76 still in the state of charging.

At this time, the transistor 80 is also fully conducting and as a result of such conduction energizes the coil 82 of a fault counting mechanism and the coil 84 of a relay. The coil 84 is energized through a diode 85 and the coil 82 has a diode 86 connected in parallel therewith so as to provide paths for dissipating the voltages induced across the coils 82 and 84 when the transistor 80 is switched to an off condition. The relay of which the coil 84 is a part includes a number of sets 87, 88 and 89 of contacts. The contacts of the sets 87 and 88 may be connected to auxiliary devices such as an alarm or motor brake to be actuated or deactuated in response to the occurrence of a fault. The set 89 of contacts has its movable contact connected to ground through a reset switch 90. The normally open contact of the set 89 is in turn connected to the ground side of the coil 84 so that when the coil 84 is energized a latching circuit is completed through the reset switch 90 and the relay will remain energized until the reset button 90 is pushed to open the latching circuit.

The capacitor 76 charges relatively slowly and at the end of its charge time the flow of charging current through the base-emitter circuits of the transistors 79 and 80 ceases and the transistors 79 and 80 are turned off. The regenerative process is reversed and the transistor 75 is switched to its conducting state. The coil 82 of the counting mechanism thereupon is de-energized, but as mentioned the coil 84 of the relay remains energized through its latching circuit until the reset button 90 is pushed. Therefore, from the above description it can be seen that when the value of the current flowing through the load 31 exceeds a value determined by the setting of the variable resistor 28, the associated fault counting mechanism and relay are actuated.

If the load current increases still further beyond the level at which the counting mechanism and relay are actuated, the diode 92 conducts and makes more positive the base of the transistor 19. This in turn reduces the DC output voltage of the voltage regulator appearing on the line 18 and accordingly reduces the peak output voltage supplied to the load 31. Thus, when the load current exceeds the critical value set by the conduction of diode 92, the load current will thereafter remain relatively constant with any further reductions in the load impedance. This characteristic therefore limits the power which is dissipated in any arc or spark which occurs in the spark test electrode when a fault passes the electrode.

The normal procedure for setting up the illustrated device at the beginning of a test run is as follows: With the insulated conductor running through the test electrode and with the electrode connected to the device through the terminals 26 and 27, the desired test voltage is first set by adjusting the adjustable resistor 53, the switch 70 at this time being in the illustrated position so that an indication of such output voltage appears on the meter 62. After the resistor 53 is set to obtain the desired test voltage, the switch 70 is moved to its alternate position so that an indication of the load current is produced on the meter 62. The variable resistor 28 is then adjusted until the meter 62 indicates a desired current level. This current level may, for example, be one which is known to be 25 percent below the level required to actuate the fault counter and relay. As so adjusted, the device is, therefore, set so that a predetermined percentage increase in the load current will be registered as a fault.

I claim:

1. In a device for testing the insulation of an electrical conductor the combination comprising: means providing a source of direct current power, a voltage regulator means connected with said source of direct current power for providing a source of regulated direct current potential, means connected with said source of regulated direct current potential for repeatedly producing high voltage impulses for application to said insulation and the magnitude of which voltage impulses is directly related to the magnitude of said regulated direct current potential, means for controlling said voltage regulator means to vary the magnitude of said regulated direct current potential in response to changes in the peak value of said high voltage impulses, and means for registering a fault in response to changes in the output current supplied to the conductor under test by said high voltage impulses.

2. The combination defined in claim 1 further characterized by said means for repeatedly producing high voltage impulses consisting of a capacitor discharge circuit including a capacitor charged by said regulated direct current potential and a step-up transformer having a primary winding through which said capacitor is discharged and a secondary winding across which said high voltage impulses appear.

3. The combination defined in claim 2 further characterized by said means for controlling said voltage regulator means including a tertiary winding on said transformer, and detecting means for detecting the peak value of the voltage appearing across said tertiary winding and for producing a signal related thereto, and means coupling said detecting means with said voltage regulator means, said voltage regulator means including means responsive to changes in said signal for varying the magnitude of said regulated direct current signal.

4. The combination defined in claim 2 further characterized by said capacitor discharge circuit including an electrically triggered electronic switch for controlling the charging and discharging of said capacitor, and means for repeatedly providing triggering pulses for said switch.

5. The combination defined in claim 4 further characterized by said switch being a silicon controlled rectifier connected in series with said capacitor and said primary winding through its anode and cathode terminals.

6. The combination defined in claim 4 further characterized by means connected with said voltage regulator and responsive to said triggering pulses for reducing during each cycle of said capacitor discharge circuit the magnitude of said regulated direct current potential to a level at which the current produced thereby in said silicon controlled rectifier is insufficient to sustain conduction in the absence of any reverse voltage supplied thereto from said primary winding.

7. The combination defined in claim 1 further characterized by means for detecting the output current supplied to the conductor under test, and means responsive to said output current as detected by said detecting means for controlling said voltage regulator means so as to reduce the magnitude of said regulated direct current potential when the peak value of said output current as detected by said detecting means exceeds a predetermined level.

8. The combination defined in claim 1 further characterized by means for detecting the output current supplied to the conductor under test, means responsive to said output current as detected by said detecting means for automatically registering a fault when the peak value of said output current exceeds a predetermined level, and means also responsive to said output current as detected by said detecting means and coupled with said voltage regulator means for controlling said voltage regulator means so as to cause it to reduce the magnitude of said regulated direct current potential when the peak value of said output current exceeds a still higher predetermined level.

9. In a device for testing the insulation of an electrical conductor, the combination comprising: means providing a source of direct current power, a voltage regulator means connected with said source of direct current power for providing a source of regulated direct current potential, means connected with said source of regulated direct current potential for repeatedly producing high voltage impulses for application to said insulation the magnitude of which voltage impulses is directly related to the magnitude of said regulated direct current potential, detecting means for detecting the peak value of the output current supplied to the conductor under test by said high voltage impulses, means coupled with said detecting means for controlling said voltage regulator means so as to reduce the magnitude of said regulated direct current potential when the peak value of said output current as detected by said detecting means exceeds a predetermined level, and means coupled with said detecting means for registering a fault in response to changes in said peak value of said output current.

10. The combination defined in claim 9 further characterized by said means for repeatedly producing high voltage impulses consisting of a capacitor discharge circuit including a capacitor charged by said regulated direct current potential and a step-up transformer having a primary winding through which said capacitor is discharged and a secondary winding across which said high voltage impulses appear, said means for detecting the peak value of the output current including a resistor connected in series with said secondary winding, a capacitor connected with said resistor so as to be charged by the voltage appearing thereacross, and means for detecting the voltage which appears across said capacitor.

11. The combination defined in claim 9 further characterized by means for automatically registering a fault when the peak value of said output current as detected by said detecting means exceeds a lower predetermined level.

12. The combination defined in claim 9 further characterized by said means for detecting the output current supplied to the conductor under test consisting of a resistor through which said output current passes, a capacitor, a rectifier for rectifying the voltage appearing across said resistor and applying it to said capacitor, and means responsive to the voltage across said capacitor for controlling said voltage regulator to reduce said regulated direct current potential when the voltage across said capacitor exceeds a predetermined value.

13. The combination defined in claim 12 further characterized by means for energizing said fault registering means so as to indicate a fault whenever the voltage across said capacitor exceeds a predetermined value below the value required to reduce said regulated direct current potential.

14. The combination defined in claim 13 further characterized by said resistor being adjustable, and a meter connectible with said capacitor for obtaining a reading related to the voltage thereacross.

15. In a device for testing the insulation of an electrical conductor the combination comprising: means for providing a source of direct current potential, a capacitor discharge circuit connected with said source of direct current potential for repeatedly producing high voltage impulses for application to said insulation, said capacitor discharge circuit including a capacitor charged by said direct current potential and a step-up transformer having a primary winding through which said capacitor is discharged and a secondary winding across which said high voltage impulses appear, a silicon controlled rectifier connected in series with said capacitor and said primary winding through its anode and cathode terminals, means for supplying a repetitive series of time spaced triggering pulses to said silicon controlled rectifier for switching said silicon controlled rectifier to a conducting state in response to each such pulse, other means responsive to said triggering pulses for momentarily reducing during each cycle of said capacitor discharge circuit the magnitude of said direct current potential to a level at which the current produced thereby in said silicon controlled rectifier is insufficient to sustain conduction in the absence of any reverse voltage supplied thereto from said primary winding, and means for registering a fault in response to changes in the output current supplied to the conductor under test by said high voltage impulses.

16. In a device for testing the insulation of an electrical conductor the combination comprising: means providing a source of direct current power, a voltage regulator means connected with said source of direct current power for providing a source of regulated direct current potential; a capacitor connected with said source of regulated direct current potential so as to be charged thereby; a transformer having a primary winding connected in series with said capacitor, a secondary winding adapted for connection to a load, and a tertiary winding, a silicon controlled rectifier connected in series with said capacitor and said primary winding for controlling the charging and discharging of said capacitor; means providing a source of pulses for triggering said silicon controlled rectifier; means for detecting the peak voltage appearing across said tertiary winding; means for controlling said voltage regulator means in response to the peak voltage detected by said detecting means to vary said regulated direct current potential so that as said detected peak voltage increases said regulated direct current potential is decreased, and means for registering a fault in response to changes in the current passing through said secondary winding.

17. The combination defined in claim 16 further characterized by means connected with said source of pulses and with said voltage regulator means for operating said regulator means so as to reduce said direct current potential during a small portion of the interval between each two of said triggering pulses.

References Cited

UNITED STATES PATENTS

| | | | |
|---|---|---|---|
| 2,249,157 | 7/1941 | Morgan et al. | 324—55 |
| 2,280,119 | 4/1942 | Gorman et al. | 324—54 |
| 2,436,615 | 2/1948 | Stearns | 324—54 |
| 3,237,088 | 2/1966 | Karp et al. | 307—297 XR |
| 3,259,893 | 7/1966 | Parker | 324—54 XR |
| 3,267,350 | 8/1966 | Graham et al. | 323—9 XR |
| 3,284,724 | 11/1966 | Marlow | 307—297 XR |
| 3,327,199 | 6/1967 | Gardner et al. | 307—297 XR |
| 3,339,136 | 8/1967 | Rasor et al. | 324—54 |
| 3,356,930 | 12/1967 | Lupoli et al. | 323—20 |

GERARD R. STRECKER, Primary Examiner

U.S. Cl. X.R.

307—297; 323—20